(12) United States Patent
Sinusas et al.

(10) Patent No.: US 11,332,240 B2
(45) Date of Patent: *May 17, 2022

(54) ANTI-TORQUE SYSTEMS FOR ROTORCRAFT

(71) Applicant: Textron Innovations Inc., Providence, RI (US)

(72) Inventors: Eric A. Sinusas, Euless, TX (US); Erik John Oltheten, Fort Worth, TX (US); Carlos Alexander Fenny, Fort Worth, TX (US)

(73) Assignee: Textron Innovations Inc., Providence, RI (US)

(*) Notice: Subject to any disclaimer, the term of this patent is extended or adjusted under 35 U.S.C. 154(b) by 11 days.

This patent is subject to a terminal disclaimer.

(21) Appl. No.: 17/035,629

(22) Filed: Sep. 28, 2020

(65) Prior Publication Data

US 2021/0061455 A1 Mar. 4, 2021

Related U.S. Application Data

(60) Continuation-in-part of application No. 16/886,000, filed on May 28, 2020, now Pat. No. 11,174,018, and (Continued)

(51) Int. Cl.
*B64C 27/82* (2006.01)
*B64C 27/04* (2006.01)
*G05D 1/08* (2006.01)

(52) U.S. Cl.
CPC .............. *B64C 27/82* (2013.01); *B64C 27/04* (2013.01); *G05D 1/0858* (2013.01); (Continued)

(58) Field of Classification Search
CPC .. B64C 5/06; B64C 5/02; B64C 27/26; B64C 27/82; B64C 27/04; B64C 2027/8209;
(Continued)

(56) References Cited

U.S. PATENT DOCUMENTS 7,032,860 B1   4/2006 Kirk et al.
9,453,516 B2   9/2016 Kreitmair-Steck
(Continued)

FOREIGN PATENT DOCUMENTS

DE  102005046155 A1  4/2007
EP      2394914 A1  12/2011
(Continued)

OTHER PUBLICATIONS

Besse et al.; RTM Technology for Fenestron Blade; Eurocopter; Jan. 1997.
(Continued)

*Primary Examiner* — Justin M Benedik
(74) *Attorney, Agent, or Firm* — Lawrence Youst PLLC

(57) ABSTRACT

An anti-torque system for a rotorcraft includes a first tail fan assembly including a plurality of first fan blades and a second tail fan assembly including a plurality of second fan blades. The first tail fan assembly has a larger diameter than the second tail fan assembly. The first fan blades have a larger rotational inertia than the second fan blades such that the second fan blades experience a larger angular acceleration than the first fan blades in response to torque, thereby providing yaw control for the rotorcraft.

20 Claims, 4 Drawing Sheets

Related U.S. Application Data a continuation-in-part of application No. 15/896,307, filed on Feb. 14, 2018, now Pat. No. 10,814,970, said application No. 16/886,000 is a division of application No. 15/458,525, filed on Mar. 14, 2017, now Pat. No. 10,703,471, which is a continuation-in-part of application No. 15/172,811, filed on Jun. 3, 2016, now Pat. No. 10,377,479.

(52) U.S. Cl.
CPC ............ *B64C 2027/8209* (2013.01); *B64C 2027/8227* (2013.01); *B64C 2027/8254* (2013.01); *B64C 2220/00* (2013.01)

(58) Field of Classification Search
CPC .... B64C 2027/8227; B64C 2027/8254; B64C 2220/00; G05D 1/0858
See application file for complete search history.

(56) References Cited

U.S. PATENT DOCUMENTS

| | | | |
|---|---|---|---|
| 10,377,479 B2 * | 8/2019 | Parsons | B64C 27/82 |
| 2011/0121128 A1 * | 5/2011 | Balkus, Jr. | B64C 27/006 |
| | | | 244/17.21 |
| 2013/0134256 A1 * | 5/2013 | Gaillard | B64C 27/82 |
| | | | 244/17.21 |
| 2013/0170985 A1 | 7/2013 | Altmikus et al. | |
| 2013/0205941 A1 | 8/2013 | Tanose | |
| 2013/0206915 A1 | 8/2013 | Desaulniers | |
| 2015/0001337 A1 | 1/2015 | McCollough et al. | |
| 2016/0280369 A1 | 9/2016 | Pounds | |
| 2017/0349274 A1 | 12/2017 | Fenny et al. | |
| 2017/0349276 A1 | 12/2017 | Fenny | |

FOREIGN PATENT DOCUMENTS

| | | |
|---|---|---|
| EP | 3501983 A1 | 6/2019 |
| JP | H07156890 A | 6/1995 |
| JP | H09175495 A | 7/1997 |
| JP | 2009051465 A | 3/2009 |
| JP | 2009090755 A | 4/2009 |

OTHER PUBLICATIONS

Composites Take Off at Paris Air Show; Reinforced Plastics; Oct. 1995.

European Exam Report; Application No. EP19154286.9; European Patent Office; dated May 27, 2019.

European Search Report; Application No. EP19154286.9; European Patent Office; dated May 10, 2019.

Janker et al.; Helicopter Hybridisation—The Key for Drastic Reductions of Fuel Burn and Emissions; American Helicopter Society; May 3-5, 2011.

\* cited by examiner

ANTI-TORQUE SYSTEMS FOR ROTORCRAFT

CROSS-REFERENCE TO RELATED APPLICATIONS

This patent application is a continuation of U.S. application Ser. No. 15/896,307 filed Feb. 14, 2018 and is a continuation-in-part of U.S. application Ser. No. 16/886,000 filed May 28, 2020, which is a divisional of U.S. application Ser. No. 15/458,525 filed Mar. 14, 2017, now U.S. Pat. No. 10,703,471, which is a continuation-in-part of application Ser. No. 15/172,811 filed Jun. 3, 2016, now U.S. Pat. No. 10,377,479.

TECHNICAL FIELD OF THE DISCLOSURE

The present disclosure relates, in general, to anti-torque systems operable for use on rotorcraft and, in particular, to anti-torque systems including two or more tail fans having different rotational inertias to meet the thrust, responsiveness and other requirements of the rotorcraft.

BACKGROUND

The main rotor of a helicopter, which produces lift necessary for flight, also produces a counteracting torque force on the fuselage of the helicopter, turning the tailboom of the helicopter in the opposite direction of the main rotor. The helicopter's tail fan, or rotor, located aft of the main rotor, is used to counteract this torque and control the yaw of the helicopter. One consideration regarding the performance of a tail fan is the tail fan's capability to output sufficient anti-torque thrust to maintain control of the yaw of the helicopter. Typically, the tail fan is required to output a higher anti-torque thrust when the helicopter is performing a sideward flight maneuver or experiencing strong side winds. In such circumstances, the tail fan may be required to output anti-torque thrust at or near its maximum capabilities. Another consideration regarding the performance of the tail fan is its responsiveness when changing or correcting the yaw of the helicopter. Ideally, a tail fan should be able to change speed rapidly to quickly and precisely control the helicopter's yaw. Current tail fans, including both fixed and variable rotational speed systems, face difficulties in meeting both the thrust and responsiveness requirements mentioned above. For example, while a large tail fan may be able to easily meet the maximum anti-torque thrust requirement for maintaining yaw in sideward flight conditions, the correspondingly large rotational inertia of the tail fan may hinder its responsiveness when quick yaw adjustments are necessary. Conversely, a smaller tail fan having a lower rotational inertia can more easily meet responsiveness requirements, but may be unable to output the anti-torque thrust required by the helicopter in all operational circumstances. Accordingly, the need has arisen for an improved anti-torque system that is capable of meeting the thrust, responsiveness, cost and other performance requirements of rotorcraft.

SUMMARY

In a first aspect, the present disclosure is directed to an anti-torque system for a rotorcraft including a first tail fan assembly including a plurality of first fan blades and a second tail fan assembly including a plurality of second fan blades. The first tail fan assembly has a larger diameter than the second tail fan assembly. The first fan blades have a larger rotational inertia than the second fan blades such that the second fan blades experience a larger angular acceleration than the first fan blades in response to torque, thereby providing yaw control for the rotorcraft.

In some embodiments, the first and second fan assemblies may be fixed pitch, variable rotational speed fan assemblies. In other embodiments, the first and second fan assemblies may be variable pitch, fixed rotational speed fan assemblies. In certain embodiments, the first tail fan assembly may form a larger rotor disk diameter than the second tail fan assembly. In some embodiments, the first fan blades may be longer than the second fan blades. In certain embodiments, the first fan blades may be formed from a different material than the second fan blades. In some embodiments, the plurality of first fan blades may include a larger number of fan blades than the plurality of second fan blades. In certain embodiments, the first fan blades may be wider than the second fan blades.

In some embodiments, the first fan blades may include a circumferential tip ring. In certain embodiments, at least one of the first or second tail fan assemblies may be a shrouded tail fan assembly. In some embodiments, at least one of the first or second tail fan assemblies may be an open tail fan assembly. In certain embodiments, the first tail fan assembly may include a plurality of first tail fan assemblies and the second tail fan assembly may include a plurality of second tail fan assemblies. In some embodiments, the anti-torque system may include at least one motor configured to provide torque to the first and second fan blades. In certain embodiments, the at least one motor may include first and second motors. In such embodiments, the first tail fan assembly may include the first motor and the second tail fan assembly may include the second motor. In some embodiments, the motor may be an electric or hydraulic motor. In certain embodiments, the motor may be a variable speed motor. In some embodiments, the first fan blades and the second fan blades may be formed from the same material.

In a second aspect, the present disclosure is directed to a rotorcraft including a fuselage, a tailboom extending from the fuselage and an anti-torque system at least partially located at the aft portion of the tailboom. The anti-torque system includes a first tail fan assembly including a plurality of first fan blades and a second tail fan assembly including a plurality of second fan blades. The first tail fan assembly has a larger diameter than the second tail fan assembly. The first fan blades have a larger rotational inertia than the second fan blades such that the second fan blades experience a larger angular acceleration than the first fan blades in response to torque, thereby providing yaw control for the rotorcraft.

In some embodiments, the aft portion of the tailboom may include a vertical fin, and the first and second tail fan assemblies may be coupled to the vertical fin. In some embodiments, the rotorcraft may include a flight control computer including an anti-torque controller in communication with the first and second tail fan assemblies. In such embodiments, the anti-torque controller may be operable to control the yaw of the rotorcraft using the first and second tail fan assemblies. In certain embodiments, the anti-torque controller may include a yaw change determination module operable to determine a yaw adjustment for the rotorcraft and a tail fan control module operable to modify the yaw of the rotorcraft using the first and second tail fan assemblies.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1A:
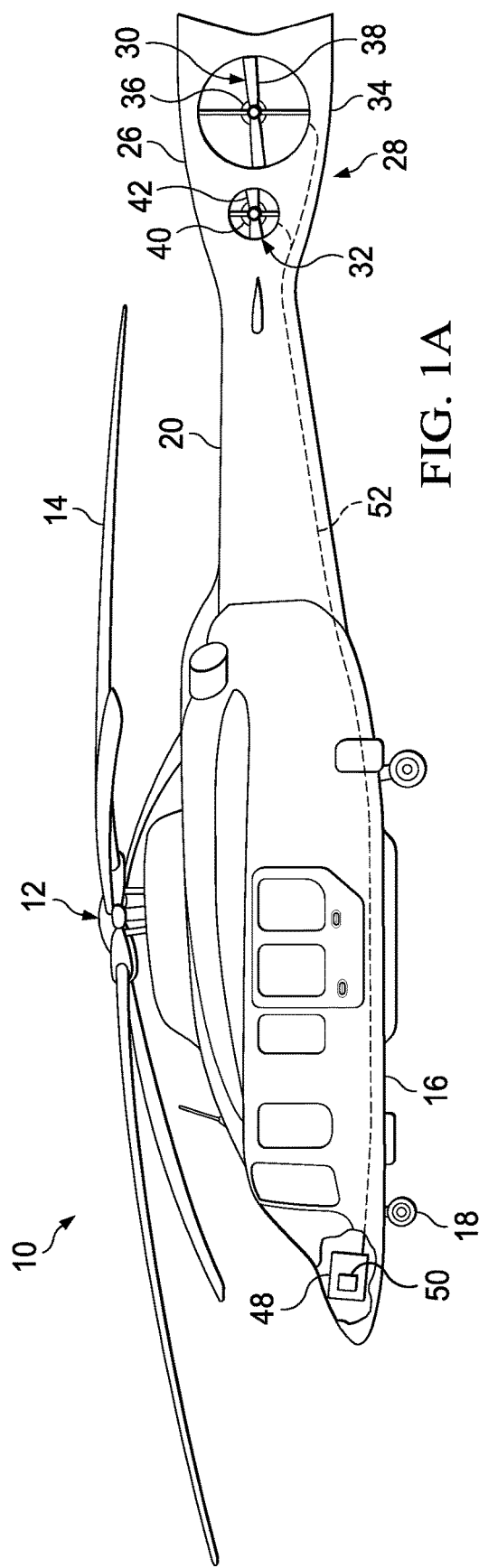
FIGS. 1A-1D are schematic illustrations of a rotorcraft including an anti-torque system in accordance with embodiments of the present disclosure.
Figure 1B:
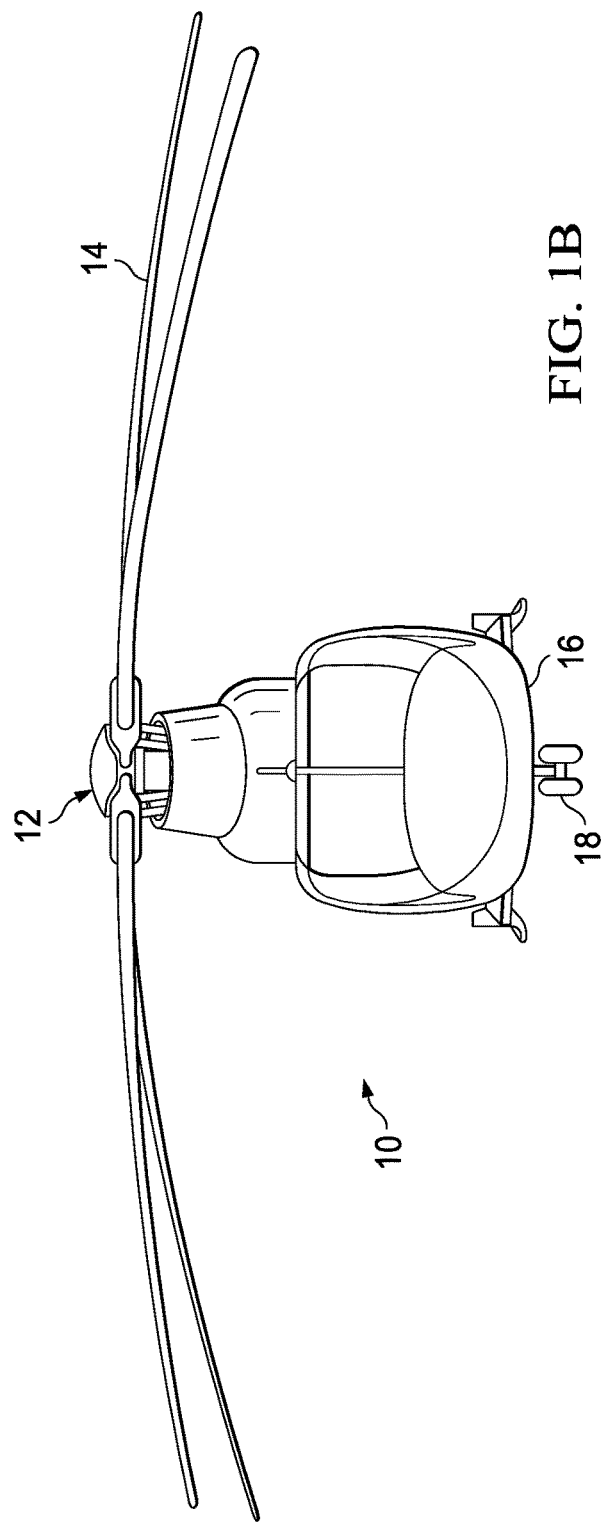
Figure 1C:
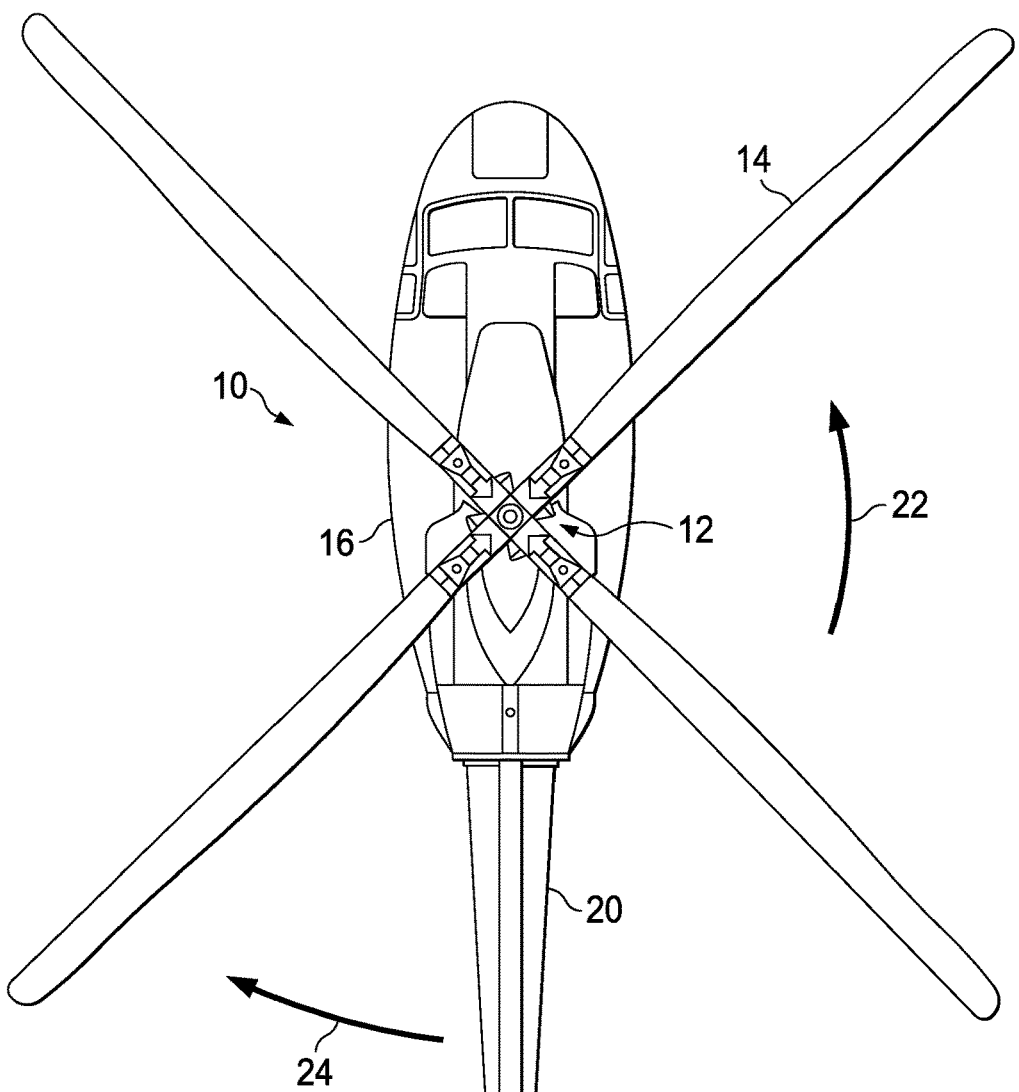
Figure 1D:
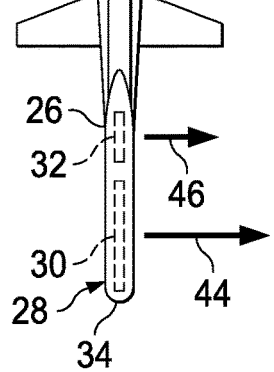
Figure 1D:
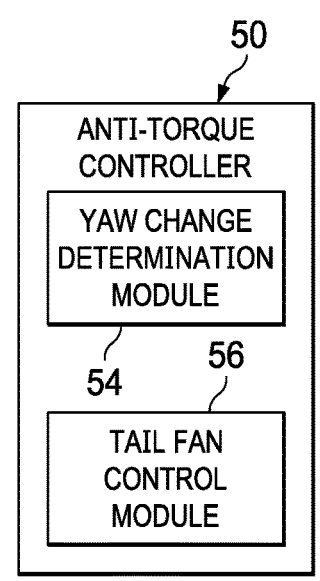

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1D in the drawings, a rotorcraft is schematically illustrated and generally designated 10. In the illustrated embodiment, rotorcraft 10 is depicted as a helicopter having a main rotor 12, which includes a plurality of rotor blade assemblies 14. Main rotor 12 is rotatable relative to a fuselage 16. The pitch of rotor blade assemblies 14 can be collectively and/or cyclically manipulated to selectively control direction, thrust and lift of rotorcraft 10. A landing gear system 18 provides ground support for rotorcraft 10. A tailboom 20 extends from fuselage 16. Main rotor 12 rotates in a direction indicated by arrow 22, which produces a torque on fuselage 16 in a direction indicated by arrow 24. Aft portion 26 of tailboom 20 includes an anti-torque system 28, which is operable to counteract torque 24 and generally control the yaw of rotorcraft 10.

Helicopters have traditionally included a single tail fan, or rotor, located at aft portion 26 of tailboom 20 to counteract torque 24. As used herein, including in the claims, a fan includes both fixed pitch, variable rotational speed rotor systems and/or variable pitch, fixed rotational speed rotor systems. A single tail fan, however, compromises the maximum thrust and responsiveness requirements of the helicopter. In particular, a large tail fan may be sufficient to counteract torque 24 in all operational circumstances, but may be unable to adjust or correct the yaw of rotorcraft 10 in a sufficiently responsive manner by virtue of the tail fan's high rotational inertia. Conversely, a small tail fan with a low rotational inertia may be sufficiently responsive, but unable to meet the anti-torque thrust demands necessary to counteract torque 24 in some operational circumstances, such as during sideward flight or sideward wind conditions. To address these and other deficiencies of current helicopters, anti-torque system 28 includes two tail fan assemblies 30, 32 located at aft portion 26 of tailboom 20. In the illustrated embodiment, aft portion 26 of tailboom 20 also includes a vertical fin 34 to which tail fan assemblies 30, 32 are rotatably coupled. Tail fan assembly 30 includes a motor 36 that provides torque to fan blades 38. Similarly, tail fan assembly 32 includes motor 40 that provides torque to fan blades 42. Fan blades 38, 42 may be fixed pitch fan blades and motors 36, 40 may be variable speed motors capable of producing a wide range of revolutions per minute (RPM).

Fan blades 38 of tail fan assembly 30 have a larger rotational inertia, or moment of inertia or angular mass, than fan blades 42 of tail fan assembly 32. In the illustrated embodiment, fan blades 38 have a larger rotational inertia by virtue of being longer than fan blades 42. Fan blades 38 thus form a larger rotor disk, in terms of area and diameter, than fan blades 42. Because fan blades 42 are shorter than fan blades 38, fan blades 42 are adapted to experience a larger angular acceleration in response to torque from motor 40 than that experienced by fan blades 38 in response to torque from motor 36. On the other hand, fan blades 38 are capable of producing a larger maximum anti-torque thrust 44 than the maximum anti-torque thrust 46 produced by fan blades 42. In this manner, anti-torque system 28 provides responsive yaw control for rotorcraft 10 using tail fan assembly 32 while remaining capable of providing the anti-torque thrust required in all operational circumstances, including sideward flight or side wind conditions, using tail fan assembly 30. Tail fan assembly 30 is capable of moving a higher air volume and/or may be more efficient in outputting anti-torque thrust 44 by virtue of having a higher inertia. However, tail fan assembly 32 may respond more quickly to yaw control inputs from the pilot or from elsewhere, and be able to change speed rapidly for finer yaw control of rotorcraft 10. The smaller diameter of tail fan assembly 32 also reduces the tip speed, and therefore noise, of rotating fan blades 42. Thus, tail fan assembly 32 may be utilized when a reduced noise environment is preferable, such as during air reconnaissance or clandestine operations. By utilizing tail fan assembly 32 for quicker and/or finer yaw adjustments and tail fan assembly 30 to achieve higher maximum anti-torque thrust 44, anti-torque system 28 is able to utilize two or more tail fans to achieve optimal responsiveness, maximum thrust and cost in managing the yaw of rotorcraft 10.

While motors 36, 40 are variable speed motors capable of having a large range of RPM settings, in other embodiments motors 36, 40 may be fixed speed or other types of motors. For example, either or both of motors 36, 40 may be a stacked motor assembly in which two or more motors are stacked end-to-end and drive a single driveshaft to provide torque for a respective tail fan. Either or both of motors 36, 40 may be an electric motor, hydraulic motor or mechanically-driven motor. Anti-torque system 28 may utilize any number of motors to drive the tail fan assemblies included therein. For example, anti-torque system 28 may include a single motor that drives both tail fan assemblies 30, 32. Tail fan assemblies 30, 32 are both shrouded, or fenestron, fantail or ducted, tail fan assemblies. While tail fan assemblies 30, 32 are both shrouded within vertical fin 34, in other embodiments tail fan assemblies 30, 32 may be shrouded by ducts that are structurally independent from tailboom 20 or vertical fin 34. Shrouding tail fan assemblies 30, 32 helps to reduce the edgewise flow on fan blades 38, 42, which can cause undesirable moments on tailboom 20. Although high inertia tail fan assembly 30 is located aft of low inertia tail fan assembly 32, in other embodiments high inertia tail fan assembly 30 may be located forward of low inertia tail fan assembly 32. In yet other embodiments, tail fan assemblies 30, 32 may be vertically, instead of horizontally, aligned.

Rotorcraft 10 includes flight control computer 48. In some embodiments, flight control computer 48 includes an anti-torque controller 50 that controls the yaw of rotorcraft 10 using tail fan assemblies 30, 32. Anti-torque controller 50 may be in mechanical, electrical, wireless, computer or any other type of communication 52 with tail fan assemblies 30, 32. Anti-torque controller 50 includes a yaw change determination module 54 to determine an amount by which to change or correct the yaw of rotorcraft 10. In determining the yaw adjustment for rotorcraft 10, yaw change determination module 54 may include and utilize a yaw rate sensor and/or a yaw position sensor. Anti-torque controller 50 also includes a tail fan control module 56 to modify the yaw of rotorcraft 10 using tail fan assemblies 30, 32. Tail fan control module 56 may determine the magnitude of anti-torque thrusts 44, 46 that are required to achieve the desired yaw of rotorcraft 10 as determined by yaw change determination module 54. Tail fan control module 56 may also determine how quickly anti-torque thrust must be implemented so that the desired yaw is achieved in a timely manner. Tail fan control module 56 may thus determine whether and how fast to rotate each tail fan assembly 30, 32, taking into account that tail fan assembly 30 has a higher rotational inertia, and thus a lower angular acceleration, than tail fan assembly 32. Anti-torque controller 50 thus enhances the yaw management of rotorcraft 10 by selectively activating tail fan assemblies 30, 32 depending on the thrust and responsiveness requirements of the operational circumstance.

It should be appreciated that rotorcraft 10 is merely illustrative of a variety of aircraft that can implement the embodiments disclosed herein. Indeed, anti-torque system 28 may be implemented on any aircraft that experiences yaw movement. Other aircraft implementations can include hybrid aircraft, tiltrotor aircraft, tiltwing aircraft, quad tiltrotor aircraft, unmanned aircraft, gyrocopters, airplanes and the like. Anti-torque system 28 may also be utilized on rotorcraft having a distributed propulsion system with two or more rotors powered by an electrical, hydraulic, mechanical or other energy source. As such, those skilled in the art will recognize that anti-torque system 28 can be integrated into a variety of aircraft configurations. It should be appreciated that even though aircraft are particularly well-suited to implement the embodiments of the present disclosure, non-aircraft vehicles and devices can also implement the embodiments.

Figure 2A:
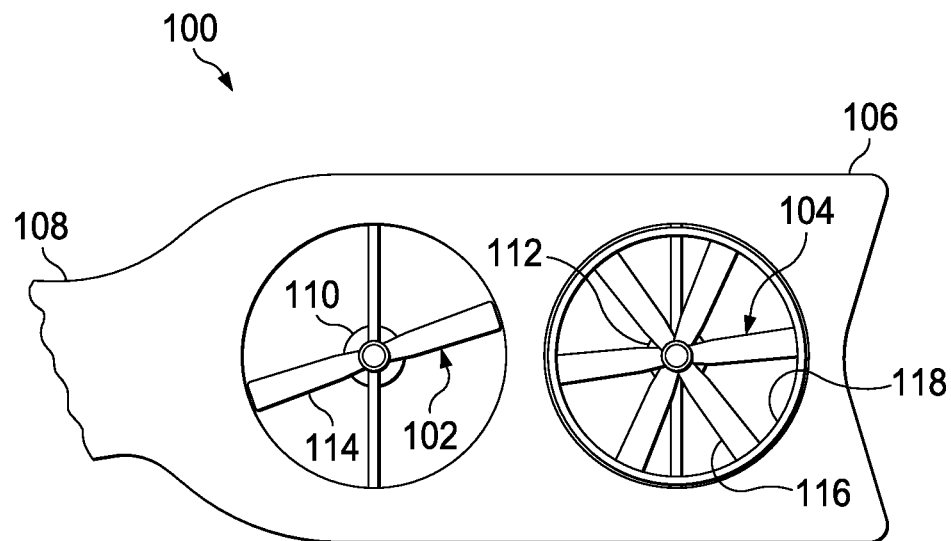
FIGS. 2A-2B are side views of anti-torque systems for rotorcraft in accordance with embodiments of the present disclosure.
Figure 2B:
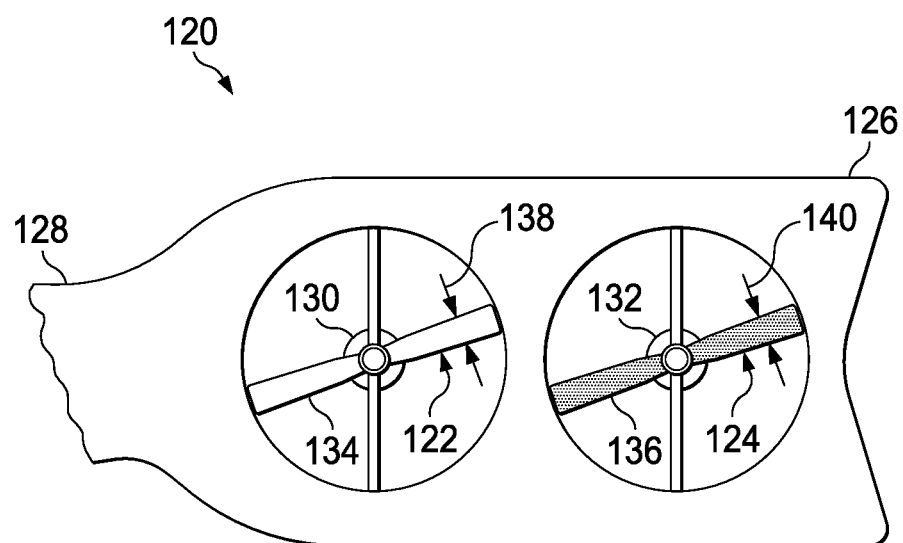

Referring to FIGS. 2A-2B in the drawings, a variety of anti-torque system configurations are shown by which to differentiate the rotational inertias of the tail fan assemblies therein. Referring to FIG. 2A, anti-torque system 100 includes low inertia tail fan assembly 102 and high inertia tail fan assembly 104 shrouded within vertical fin 106 of tailboom 108. High inertia tail fan assembly 104 has a higher rotational inertia than low inertia tail fan assembly 102. Each tail fan assembly 102, 104 includes a motor 110, 112 and fan blades 114, 116, respectively. While fan blades 114 and fan blades 116 each have the same length, high inertia tail fan assembly 104 includes a larger number of fan blades 116. Because high inertia tail fan assembly 104 includes a larger number of fan blades, fan blades 116 collectively have a higher rotational inertia, have a lower angular acceleration and are capable of producing a higher maximum anti-torque thrust than fan blades 114 of low inertia tail fan assembly 102. Also contributing to the higher rotational inertia of high inertia tail fan assembly 104 is circumferential tip ring 118 coupled to the outboard tips of fan blades 116 and rotatable with tail fan assembly 104. Circumferential tip ring 118 reduces gaps between fan blades 116 and a shroud or enclosure ring, in this case vertical fin 106, to reduce tip gap and efficiency losses and increase thrust performance. Circumferential tip ring 118 may also help to reduce the noise produced by high inertia tail fan assembly 104.

Referring to FIG. 2B, anti-torque system 120 includes low inertia tail fan assembly 122 and high inertia tail fan assembly 124 shrouded within vertical fin 126 of tailboom 128. High inertia tail fan assembly 124 has a higher rotational inertia than low inertia tail fan assembly 122. Each tail fan assembly 122, 124 includes a motor 130, 132 and fan blades 134, 136, respectively. Despite fan blades 134, 136 having the same length, high inertia tail fan assembly 124 achieves a higher rotational inertia than low inertia tail fan assembly 122 by virtue of fan blades 136 being formed from a different material than fan blades 134. In particular, fan blades 134 are formed from a lighter material than fan blades 136. In one non-limiting example, fan blades 136 may be formed from an aluminum or aluminum alloy material and fan blades 134 may be formed from a lighter composite or carbon-based material. Such composite or carbon-based materials may be more expensive than the material from which fan blades 136 are formed. If cost is a compelling design constraint, composite, carbon-based or other expensive materials may be more sparingly used throughout the two or more tail fan assemblies of anti-torque system 120. In some embodiments, fan blades 134 may be formed from a low inertia and low strength material and fan blades 136 may be formed from a high inertia and high strength material. The rotational inertias of tail fan assemblies 122, 124 may also be differentiated from one another by varying the widths of fan blades 134 relative to fan blades 136. For example, width 138 of fan blades 134 may be smaller than width 140 of fan blades 136. The widths 138, 140 of fan blades 134, 136 may differ whether or not fan blades 134, 136 are formed from the same material. In the illustrative embodiments, the fan blades of the high inertia tail fan assemblies may have a higher collective mass than the fan blades of the low inertia tail fan assemblies by virtue of being longer, wider, more numerous, formed from a heavier material or any other physical attribute.

Figure 3A:
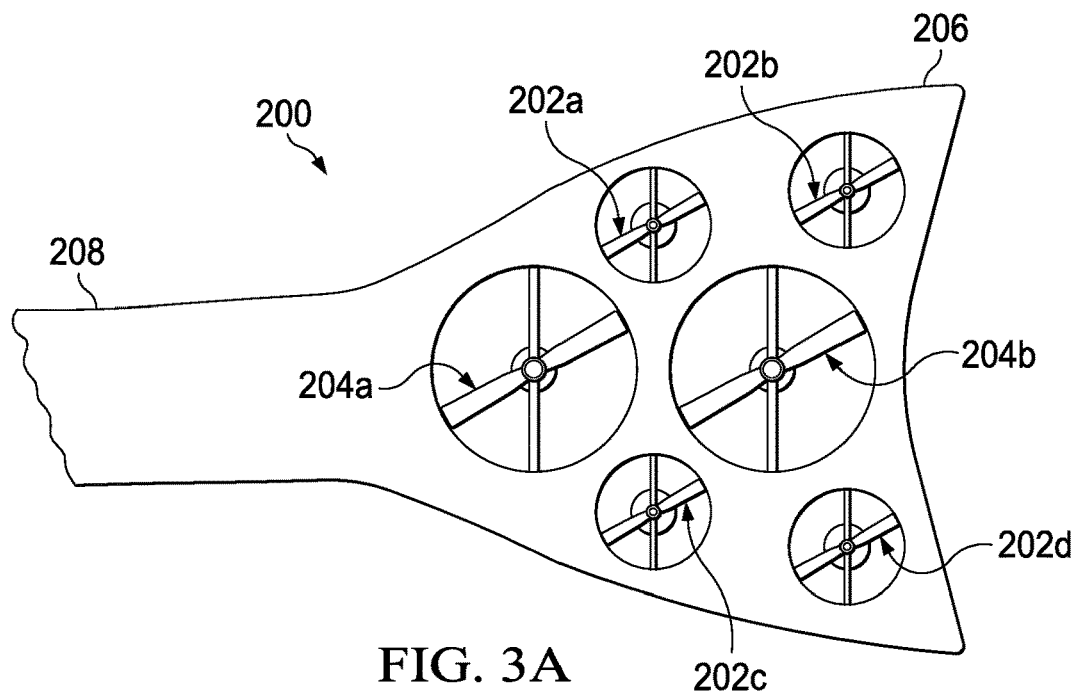
FIGS. 3A-3B are side views of anti-torque systems for rotorcraft in accordance with embodiments of the present disclosure.
Figure 3B:
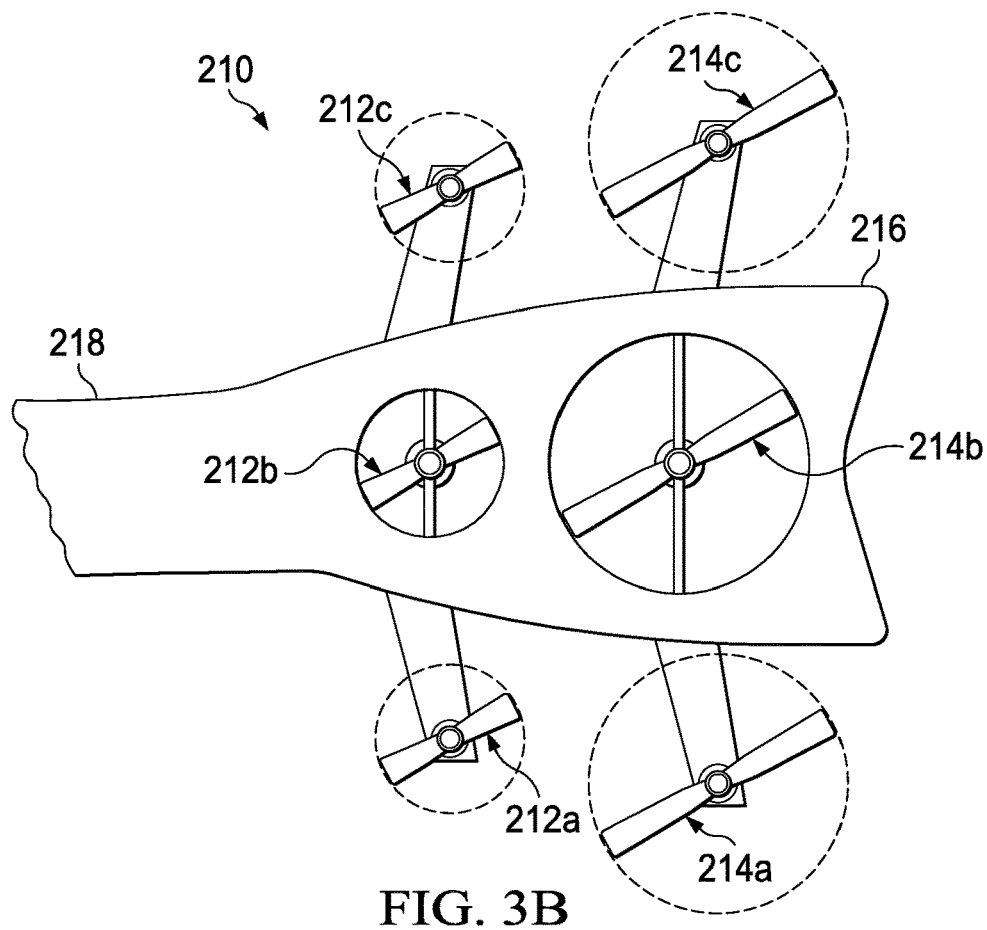

Referring to FIGS. 3A-3B in the drawings, various anti-torque system configurations for a rotorcraft are schematically illustrated. Referring to FIG. 3A, anti-torque system 200 includes four low inertia tail fan assemblies 202a-202d and two high inertia tail fan assemblies 204a-204b each having respective fan blades rotated by a respective motor. Tail fan assemblies 202a-202d, 204a-204b are each shrouded by vertical fin 206 at the aft portion of tailboom 208. The overall configuration, position or footprint of tail fan assemblies 202a-202d, 204a-204b may be tailored to fit within the confines of vertical fin 206 or other aft portion of tailboom 208. While a particular number of low inertia tail fan assemblies 202a-202d and high inertia tail fan assemblies 204a-204b are illustrated, anti-torque system 200 may include any number of low or high inertia tail fan assemblies depending on the requirements or desired attributes of the rotorcraft. For example, anti-torque system 200 may include the same or a different number of low inertia tail fan assemblies relative to high inertia tail fan assemblies, and such tail fan assemblies may be positioned at any forward or aft position along tailboom 208.

Referring to FIG. 3B, anti-torque system 210 includes three low inertia tail fan assemblies 212a-212c and three high inertia tail fan assemblies 214a-214c. Each tail fan assembly 212a-212c, 214a-214c includes respective fan blades rotated by a respective motor. Low inertia tail fan assembly 212b and high inertia tail fan assembly 214b are shrouded by vertical fin 216 at the aft portion of tailboom 218. Low inertia tail fan assemblies 212a, 212c and high inertia tail fan assemblies 214a, 214c are open, or unshrouded, tail fan assemblies. In some embodiments, unshrouded tail fan assemblies 212a, 212c, 214a, 214c may be capable of changing pitch, or flapping, to counteract edgewise flow during flight, thereby helping to prevent undesirable moments on tailboom 218. Anti-torque system 210 may include any ratio of open tail fan assemblies to shrouded tail fan assemblies. In one non-limiting example, anti-torque system 210 may include three shrouded tail fan assemblies and three open tail fan assemblies, and such open or shrouded tail fan assemblies may be either high or low inertia depending on the requirements and desired attributes of the rotorcraft. For example, all of the tail fan assemblies of anti-torque system 210 may be open tail fan assemblies in some embodiments. In other embodiments, the rotorcraft may exclude vertical fin 216 and the tail fan assemblies of anti-torque system 210 may be either open or include ducts that are structurally separate, yet coupled, to tailboom 218.

The flight control computers of the present embodiments preferably include computing elements such as non-transitory computer readable storage media that include computer instructions executable by processors for controlling flight operations. The computing elements may be implemented as one or more general-purpose computers, special purpose computers or other machines with memory and processing capability. The computing elements may include one or more memory storage modules including, but is not limited to, internal storage memory such as random access memory, non-volatile memory such as read only memory, removable memory such as magnetic storage memory, optical storage, solid-state storage memory or other suitable memory storage entity. The computing elements may be implemented as microprocessor-based systems operable to execute program code in the form of machine-executable instructions. The computing elements may be selectively connectable to other computer systems via a proprietary encrypted network, a public encrypted network, the Internet or other suitable communication network that may include both wired and wireless connections.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An anti-torque system for a rotorcraft comprising:
a first tail fan assembly including a plurality of first fan blades; and
a second tail fan assembly including a plurality of second fan blades;
wherein, the first tail fan assembly has a larger diameter than the second tail fan assembly; and
wherein, the first fan blades have a larger rotational inertia than the second fan blades such that the second fan blades experience a larger angular acceleration than the first fan blades in response to torque, thereby providing yaw control for the rotorcraft.

2. The anti-torque system as recited in claim 1 wherein the first and second fan assemblies further comprise fixed pitch, variable rotational speed fan assemblies.

3. The anti-torque system as recited in claim 1 wherein the first and second fan assemblies further comprise variable pitch, fixed rotational speed fan assemblies.

4. The anti-torque system as recited in claim 1 wherein the first fan blades and the second fan blades are formed from the same material.

5. The anti-torque system as recited in claim 1 wherein the first fan blades are longer than the second fan blades.

6. The anti-torque system as recited in claim 1 wherein the first fan blades are formed from a different material than the second fan blades.

7. The anti-torque system as recited in claim 1 wherein the plurality of first fan blades include a larger number of fan blades than the plurality of second fan blades.

8. The anti-torque system as recited in claim 1 wherein the first fan blades are wider than the second fan blades.

9. The anti-torque system as recited in claim 1 wherein the first fan blades further comprise a circumferential tip ring.

10. The anti-torque system as recited in claim 1 wherein at least one of the first or second tail fan assemblies further comprise a shrouded tail fan assembly.

11. The anti-torque system as recited in claim 1 wherein at least one of the first or second tail fan assemblies further comprise an open tail fan assembly.

12. The anti-torque system as recited in claim 1 wherein the first tail fan assembly further comprises a plurality of first tail fan assemblies and wherein the second tail fan assembly further comprises a plurality of second tail fan assemblies, the plurality of first tail fan assemblies having larger diameters than the plurality of second tail fan assemblies.

13. The anti-torque system as recited in claim 1 further comprising at least one motor configured to provide torque to the first and second fan blades.

14. The anti-torque system as recited in claim 13 wherein the at least one motor further comprises first and second motors, the first tail fan assembly including the first motor, the second tail fan assembly including the second motor.

15. The anti-torque system as recited in claim 13 wherein the at least one motor further comprises an electric motor.

16. The anti-torque system as recited in claim 13 wherein the at least one motor further comprises a variable speed motor.

17. A rotorcraft comprising:
a fuselage;
a tailboom extending from the fuselage, the tailboom having an aft portion; and
an anti-torque system at least partially located at the aft portion of the tailboom, the anti-torque system further comprising:
a first tail fan assembly including a plurality of first fan blades; and
a second tail fan assembly including a plurality of second fan blades;
wherein, the first tail fan assembly has a larger diameter than the second tail fan assembly; and
wherein, the first fan blades have a larger rotational inertia than the second fan blades such that the second fan blades experience a larger angular acceleration than the first fan blades in response to torque, thereby providing yaw control for the rotorcraft.

18. The rotorcraft as recited in claim 17 wherein the aft portion of the tailboom further comprises a vertical fin, and wherein the first and second tail fan assemblies are coupled to the vertical fin.

19. The rotorcraft as recited in claim 17 further comprising a flight control computer including an anti-torque controller in communication with the first and second tail fan assemblies, the anti-torque controller operable to control the yaw of the rotorcraft using the first and second tail fan assemblies.

20. The rotorcraft as recited in claim 19 wherein the anti-torque controller further comprises a yaw change determination module operable to determine a yaw adjustment for the rotorcraft and a tail fan control module operable to modify the yaw of the rotorcraft using the first and second tail fan assemblies.

* * * * *